United States Patent
Pickett

[15] 3,655,264
[45] Apr. 11, 1972

[54] BINOCULAR VIEWING DEVICE

[72] Inventor: Theodore C. Pickett, 1104 Stanley Way, Palo Alto, Calif. 94303

[22] Filed: Sept. 18, 1970

[21] Appl. No.: 73,472

[52] U.S. Cl. .............................350/145, 350/130, 350/286, 350/287
[51] Int. Cl. .................G02b 27/02, G02b 27/24, G02b 5/04
[58] Field of Search..................350/130, 133, 137, 145, 287, 350/143, 142, 203, 132, 146, 286; 351/49

[56] References Cited

UNITED STATES PATENTS

| 1,850,153 | 3/1932 | Paroselli | 350/137 |
| 1,878,967 | 9/1932 | Mihalyi | 350/203 |
| 2,326,951 | 8/1943 | Kober et al. | 350/130 X |
| 3,039,351 | 6/1962 | Spagna et al. | 350/145 X |

FOREIGN PATENTS OR APPLICATIONS

| 88,034 | 8/1896 | Germany | 350/137 |

Primary Examiner—David Schonberg
Assistant Examiner—Paul A. Sacher
Attorney—Townsend and Townsend

[57] ABSTRACT

A binocular device having a housing provided with a pair of prism assemblies, there being an assembly for each eye, respectively. Each assembly includes a pair of prisms used in the Dove mode with the prisms being disposed with their hypotenuse or long sides in proximity to each other. Spacing means separates the two prisms of each assembly slightly apart. The housing has means for mechanically holding each prism assembly against relative movement. The prism assemblies are relatively convergent as the forward extremity of the housing is approached. The prism assemblies operate to provide a left-to-right reversal and a fore-to-aft reversal of images of distant and concomitant close-up objects.

14 Claims, 6 Drawing Figures

Patented April 11, 1972          3,655,264
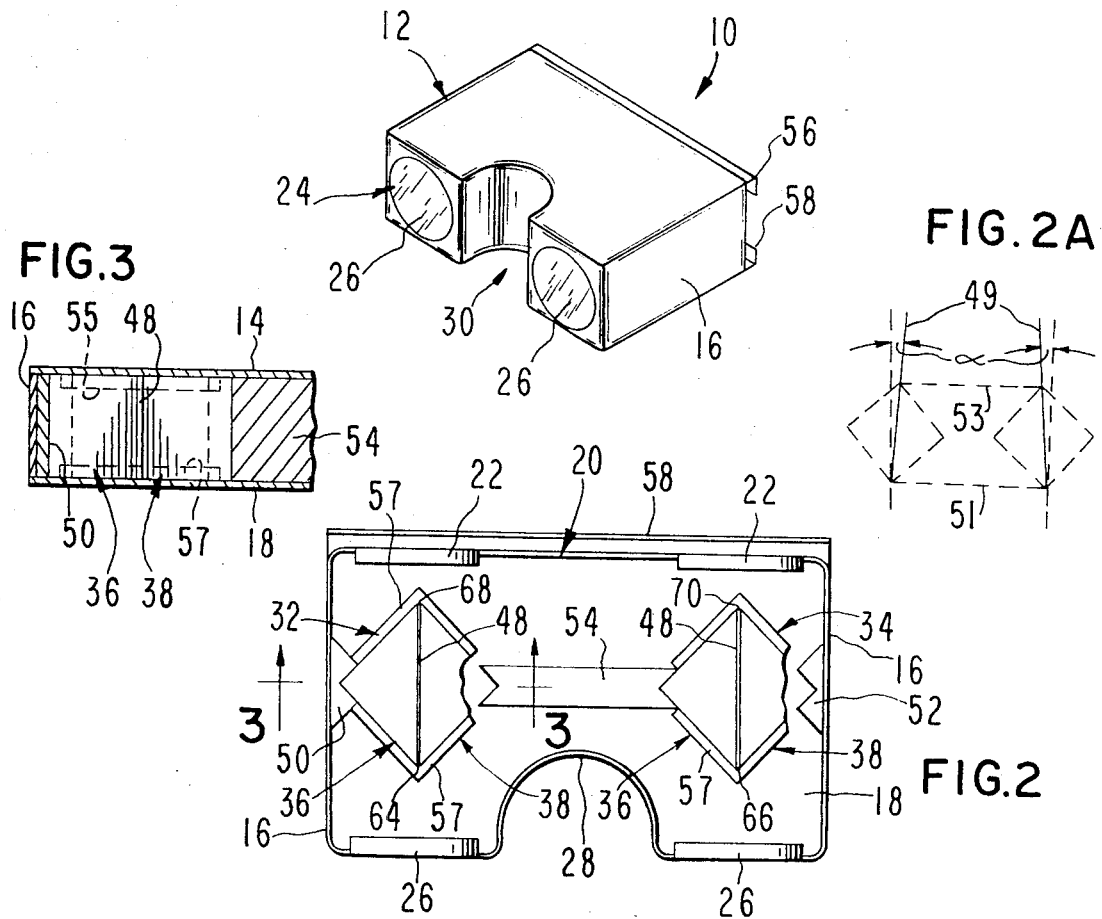

BINOCULAR VIEWING DEVICE

This invention relates to improvements in optical instruments of the type sometimes known as pseudoscopes and, more particularly, to an improved optical device utilizing prisms arranged in the Dove mode to provide for both fore-to-aft reversal and left-to-right reversal of images of objects which are viewed with the device.

Optical devices known as pseudoscopes alter the way in which the images are presented to the eyes so that the information presented to the brain by the eyes will be altered. Pseudoscopes having single prisms used in the Dove mode for binocular viewing have been made and used in the past. However, such devices are, of necessity, large in size and weight, present manufacturing problems, and are relatively expensive. With single prisms, it is difficult to compensate for differences in the interpupillary distances between the eyes of different people. Moreover, the use of a device having single prisms limits the field of view to such an extent that it can be increased only by providing a relatively large prism in front of each eye. Also, pseudoscopes made with single prisms have in the past arranged the prisms so that their optical axes are generally parallel with each other. This limits the depth of the field of the device so that objects only within a limited field of view can be viewed with relative ease. Objects outside this particular range cannot be properly viewed.

The present invention provides an improved binocular device of the type described wherein the device of the invention overcomes the limitations of earlier pseudoscopes used with single prisms. To this end, the present device utilizes two pairs of prism assemblies with the assemblies being independent of each other and with an assembly being provided for each eye, respectively. The assemblies are formed to provide a relatively wide field of view yet the physical size of the assemblies is at a minimum to thereby minimize manufacturing costs. The aforesaid improvements are realized with the use of a pair of mated prisms for each assembly, respectively, the mated prisms being used in the Dove mode and oriented so that the assemblies converge toward each other as the forward extremity of the device is approached. The mating feature assures a maximum field of view for a minimum size of the assembly and the convergence of the assemblies relative to each other assures that distant objects as well as close-up objects can be viewed with substantially the same ease.

Another feature of the invention is the way in which the prism assemblies are mounted within a housing so that they can be viewed by the eyes when the housing is placed in front of the eyes themselves. To this end, the housing is provided with mounting members which support and align the prism assemblies in place and anchor the same against any relative movement. Moreover, such mounting means allows the prisms of each assembly to be held slightly spaced apart by spacing means therebetween to overcome the formation of ghost images so as to provide for the proper internal reflection of images of objects which are viewed by the device.

The present invention operates in a manner such that it substantially alters two fundamental visual parameters, namely, left-to-right and fore-to-aft images. The prism assemblies reverse the field viewed left-to-right and this is done for both eyes independently but simultaneously. Each eye also normally receives a different retinal image in that an infinity of points on objects, or on surfaces, differ in relationship to each other in the images on each retina, and the synthesis and interpretation of these differing images by the mind, generally called perception, enable a person to sense spatial relationship. It is this point-to-point relationship that is altered by the device of this invention in such a manner that the mind interprets the spatial relationship as being altered, or technically called reversion, resulting in a fore-to-aft reversal of the relationship of the surfaces of objects or of the spatial relationships of objects that are of different distances from the device itself. Thus, the retinal images produced by the device tend to be perceived by the mind "inversely" and the fore-to-aft reversal is achieved. This causes a convex surface, for instance, to appear to be concave and a concave surface to appear to be convex. Also, objects further away appear to be closer than those that are in fact closer to the device.

Essentially, it can be said that a device of this type produces retinal images containing misinformation and it is this misinformation that is interpreted by the brain as reversals of the normal sensations of shape, form and distance. Such misinformation is absolute in the sense that reversion will occur if the mind and its function of perception perform normally. However, the mind will not always accept this misinformation and this acceptance or rejection is oftentimes random with the mind sometimes perceiving what is viewed as being normal and sometimes as being reverted, i.e., inverted fore-to-aft. Acceptance of this misinformation is apt to increase with increased usage of the device and this is particularly true of irregularly shaped objects, such as trees, flowers and the like and is further enhanced when such things are in motion. Regular and solid objects, such as houses or cars, tend to be perceived as being normal.

The present invention has a number of different applications. For instance, it can be used as a tool by artists and photographers to see subjects from different perspectives. It can be used by children and adults as an amusement device or as a component of a game. It can also be used by psychologists and others as a clinical tool in treating certain physical and emotional problems in patients, as a perceptional investigatory device, and even to correct the vision of certain persons whose physiology or psychology is such that they normally see reversionally or left-to-right and thus fore-to-aft.

The primary object of this invention is, therefore, to provide an improved binocular device of the type which produces retinal images that provide misinformation to the brain wherein the device utilizes a pair of prism assemblies which are relatively small in size, which provide a maximum field of view for a given size of each assembly, and which orient the assemblies so that they converge to assure that close-up objects as well as distance objects can be viewed with substantially the same ease.

Another object of this invention is to provide a device of the type described wherein each assembly for each eye utilizes a pair of mated prisms arranged in the Dove mode so as to compensate for differences in the interpupillary distances of different people while assuring that the field of view will be at a maximum notwithstanding the relatively small size of each assembly itself.

A further object of this invention is to provide a device of the aforesaid character wherein the assemblies are carried within a housing having means for mechanically holding the assemblies against movement relative to each other so that the prisms of each assembly can initially be separate from each other and can be dropped in place as a unit in the housing without the need for adhesive or the like to hold the prisms in their operative positions.

Other objects of this invention will become apparent as the following specification progresses, reference being had to the accompanying drawing for an illustration of an embodiment of the device.

In the drawing:

FIG. 1 is a perspective view of the device of this invention;

FIG. 2 is an enlarged top plan view of the device with the top cover removed and illustrating the two pairs of mated prisms secured in operative positions;

FIG. 2a is a schematic view, somewhat exaggerated, of the device showing the convergence of the prism pairs as the object to be viewed is approached;

FIG. 3 is an enlarged, fragmentary, cross-sectional view taken along line 3—3 of FIG. 2;

FIG. 4 is an enlarged, exploded view of one of the pairs of mated prisms, illustrating the way in which the prisms operate to reverse the image of an object seen by the eye adjacent to each prism; and FIG. 5 is a plan view of the inner surface of the top cover of the device.

The binocular device of this invention is broadly denoted by the numeral 10 and includes a housing 12 which can be constructed in essentially any manner. For purposes of illustration, the housing is provided with a top cover 14, a pair of spaced, generally parallel side walls 16, a bottom wall 18, a front wall 20 provided with light entrances comprised of a pair of windows 22, a rear wall 24, light exits comprised of rear windows 26, and a curved portion 28 defining a recessed area 30 to present a region for the bridge of the nose of the user to permit the user's eyes to be positioned in proximity to the light exits of the housing. Generally, entrance windows 22 will be in a plane which is parallel with the plane in which exit windows 26 are disposed. Also light entrance and exit ports or openings can be used in lieu of front and rear windows 22 and 26, if desired. The light entrances and exits are aligned with each other to present corresponding light paths through the housing.

While the housing is shown as being generally rectangular, it can be of other configurations as well. Typically, the spacing between side walls 16 will be approximately 4½ inches, the spacing between front and rear walls 20 and 24 will be approximately 2 inches, and the spacing between the top and bottom covers 14 and 18 will be 1½ inches. Also the side, front and rear walls will preferably be integral with bottom wall 18 and top cover 14 will be removably mounted on the side, front and rear walls and fastened thereto in some suitable manner, such as by flanges or the like permitting the top cover to be snapped in place in covering relationship to the interior of the housing.

Device 10 has a pair of spaced prism assemblies 32 and 34 in the housing across respective light paths defined by the light entrance and exit windows, assembly 32 being for the left eye and assembly 34 being for the right eye. The prisms of each assembly are shown as being right angle or 90° prisms but it is possible that the prisms could deviate by several degrees from a 90° configuration depending upon the index of refraction of the material forming the prisms. The prisms of the assemblies are substantially identical in size and shape; thus, a description of one of the assemblies will suffice for the other assembly.

Each prism assembly includes a first prism 36 and a second prism 38, as shown in FIG. 4. Each of these prisms has a pair of angled, flat side faces 40 and 42 which converge toward each other and terminate at the apex 44 of the prism. Side faces 40 and 42 span the distance between a pair of flat end faces 43, only one of such end faces of each prism being shown in FIG. 4 due to the way in which the same is illustrated. The opposite ends of faces 40 and 42 terminate at the flat hypotenuse or long side 46 of the prism. Each prism has an internal reflecting surface at its hypotenuse. Face 40 provides an exit for light rays passing out of the prism and face 42 provides an entrance for light rays traveling into the prism.

The prisms can be made of glass or plastic and are used in the Dove mode while being held in proximity with each by mounting means to be described, yet the prisms are kept a small distance apart by spacing means, such as a thin layer 48 of reflective material. Reflectorization is accomplished by layer 48 which will generally comprise a strip of highly polished metal between the two long sides 46 of the prisms of each assembly. This feature eliminates requirements for individually reflectorizing the two long sides 46 by mirroring, metalizing or otherwise treating the surfaces. Moreover, the prisms will be mechanically held in mated relationship in a manner to be described by structure within the housing; hence, there is no need for an adhesive to hold the prisms together.

In lieu of layer 48 between the prisms, small spacers could be used either on the vertical end margins of long sides 46 or on the horizontal margins thereof. Thus, there will not be a physical abutment of the prisms. Instead, a very thin air space will exist between sides 46 and this would permit the inner surfaces of long sides 46 to continue to be internally self-reflecting.

Housing 12 is provided with structure therewithin for mounting the two pairs of prisms in the manner shown in FIG. 2. Each pair of prisms is positioned with first end faces 43 of its prisms in engagement with the upper surface of bottom wall 18 and with the corresponding layer 48 in a plane which is substantially perpendicular to the bottom wall. The plane of each layer 48 passes generally centrally through the corresponding entrance and exit windows 22 and 26 aligned therewith. This feature greatly increases the allowable differences in interpupillary distances of human eyes. Thus, a person with closely set eyes and a person whose eyes are widely separated can look through device 10 with substantially equal ease.

The planes in which layers 48 are disposed are relatively convergent as the object to be viewed is approached. Thus, the internal reflecting surfaces of each prism assembly converges toward the internal reflecting surfaces of the other prism assembly as the entrance windows are approached. This feature can be made clear with reference to FIG. 2a where, on an exaggerated scale, the plane 49 of each layer 48 makes an angle $\alpha$ with a line 51 which is generally perpendicular with the planes of the entrance and exit windows 22 and 26. However, the angle between the converging planes 49 is $2\alpha$.

The mounting structures for the pairs of prisms include a pair of side mounting members 50 and 52 and a central mounting member 54. Member 50 has a V-shaped end notch for receiving the apex corner of the corresponding prism 36. Similarly, member 52 has a V-shaped end recess or notch for receiving the apex corner of the corresponding prism 38. Central member 54 has V-shaped recesses or notches at both ends thereof for complementally receiving the apex corners of the adjacent prisms 38 and 36, respectively.

The heights of prism assemblies 32 and 34 are substantially equal to the distance between top cover 14 and bottom wall 18 as shown in FIG. 3. Thus, when the top cover is in place, the prisms will be held against vertical movement with respect to the housing. Also, members 50, 52 and 54 can be of the same height as the prisms as shown in FIG. 3. In addition to members 50, 52 and 54, the mounting means includes a pair of V-shaped ribs 55 on the inner surface of top cover 14 (FIG. 5) for each prism assembly, respectively, and a pair of corresponding V-shaped ribs 57 on the inner surface of bottom wall 18 for each prism assembly, respectively. The heights of the ribs (FIG. 3) are such that they do not block any substantial portion of faces 40 and 42 of the prisms. The mounting members and ribs are disposed for complemental engagement with adjacent portions of respective prisms. Also, these elements are disposed to automatically provide the angle of convergence of the assemblies. Thus, with this construction, the prisms, with the spacing means therebetween, can be dropped into place in the housing and be held against any substantial movement therewith. Thus, the mounting members as well as the ribs on the top cover and the bottom wall determine the operative positions of the prism assemblies and the angle of convergence.

The mounting members and ribs can be attached to the housing in any suitable manner. For instance, the mounting members and ribs 57 can be molded with bottom wall 18 and ribs 55 can be molded with top cover 14.

Housing 12 can be provided with attachment means near the light entrance windows to hold supplementary optical materials. Such means will permit the insertion of other optical devices such as filters, lenses, and converging devices that will further alter the visual information that is passed to the prism pairs through the entrance windows. Similarly, the housing near the exit windows can be provided with such attachment means, if desired. The attachment means, as shown in FIG. 1 for the entrance windows, comprises for purposes of illustration a pair of upper and lower projecting flanges 56 and 58.

Each prism of each assembly operates in the Dove mode to reverse from right to left. This is shown by the small arrows at the entrance and exit ends of the long arrows 60 and 62 denoting light rays or paths through respective prisms. Each prism reverses left to right regardless of which of its end faces engages bottom wall 18, i.e., the apex of the prism can be pointed to the left or right (FIG. 2) and what is seen through the prism in both positions will be substantially identical. Thus, when the prisms of each assembly are in proximity to each other as they are in device 10, the field of view will be seen to be reversed regardless of whether the user looks through the left prism 36 or the right prism 38 of each assembly. It can be concluded, therefore, that, for all practical purposes the exit windows of each prism become one window and if the user shifts the housing left to right in front of the eye, one field of view will continue to be seen and it will be seen as being reversed left to right. The only aberration will be the vertical line due to the spacing means separating the prisms. If the junction between the prisms is of minimal thickness, it causes very little visual disturbance and, in actual use, the view will generally be so engrossing that the user will soon forget that there is any separation between the prisms. This single window concept of two abutted prisms should be considered in light of the fact that each prism is performing the same function, i.e., reversing the field of view left to right and, since the two prisms of each pair are optically aligned, each prism is, therefore, substantially contiguous. Thus, there is continuity in what is seen as the eye moves from one prism to the other.

Assuming that the vertical dimension of the pairs of prisms is fixed, the arrangement of proximal Dove prisms in device 10 effectively doubles the size of the window by increasing the volume of the optics by a factor of 2. It is clear, therefore, that the device can provide an optical arrangement that is much smaller, lighter and less expensive than one utilizing a single, relatively large prism used in the Dove mode which must be twice the volume of proximal Dove prisms to have a window of the same width. Thus, increasing the size of the window by increasing the size of single prisms not only adds greatly to the size and weight of the device but presents manufacturing problems and substantially increases the cost of such a device.

The foregoing can be explained with reference to well-known optical principles that the so-called window of a prism operating in the Dove mode is essentially one-half the distance between the hypotenuse and the apex, starting at the hypotenuse and extending to the midpoint of the prisms width dimension, such midpoint being denoted by the numeral 63 in FIG. 4.

For purposes of illustration, the distance between long side 46 and the corresponding apex 44 is about 1 3/16 inches and the window starting at the long side 46 and terminating at line 63 is approximately one-half of this or about twenty-two thirty-seconds of an inch wide. The exit window will increase or diminish in width in direct relationship to the size of the prism as measured from long side 46 to the apex 44. The height of the window is a direct function of the overall height of the prism. However, if the height exceeds about 1 inch, its value diminishes since, in normal vision, the horizontal field of view is of far greater importance than the vertical vision of the user of the device.

With the foregoing in mind, one can conclude from the following comments that the device 10 provides an improvement over prior art devices utilizing single prisms providing left-to-right and fore-to-aft reversal. For this purpose of explanation, it is assumed that each prism of each prism assembly measures three-fourths inches from its long side 46 to its apex 44. The prism's window is then approximately three-eighths inches from long side 46. In prior art devices, the only way to increase the length of the exit window was to select a prism having a relatively long distance between its hypotenuse or long side and its apex. Thus, for example, to get a window that was three-fourths inches wide, the distance between the hypotenuse and the apex would have to be 1 ½ inches. For such a parameter, the prism must have a hypotenuse whose length is 3 inches. Assuming the vertical height remains unchanged, the volume of such a prism would be two times that of a prism assembly of a device 10 to provide a window of the same size as that of the prism assembly. Thus, by providing a single prism to realize a desired window width not only contributes greatly to the size and the weight of the prism but also presents manufacturing problems and increases manufacturing costs.

Device 10, using prisms of any given size, doubles the field of view of a single prism by arranging the two prisms of each assembly so that the long sides of the prisms are in proximity to each other. This arrangement makes for much smaller optics volumetrically and reduces manufacturing problems and costs as opposed to increasing the size of single prisms. A typical hypotenuse length is 1 ½ inches but such length is preferably in the range between 1 ⅜ inches and 1 ¾ inches.

Device 10 operates to alter two essential visual parameters, left-to-right (and right-to-left) and fore-to-aft. Thus, misinformation is fed from the device by way of the eyes to the brain. The effect on the brain varies to some degree between persons using device 10 inasmuch as the brain of one person will not accept such misinformation as readily as that of another person. The left-to-right alteration knows no limitations of distance. Fore-to-aft reversal, however, can be perceived to the same limits as that experienced with normal two-eye vision to a maximum of about 1500 feet and this is generally described as binocular perception. This property assumes that all conditions are static, that is, that neither the persons viewing nor the objects being viewed are in motion. Under dynamic conditions, this fore-to-aft reversal can be seen for at least several miles.

Essentially, binocular vision or so-called depth perception is based on the changing relative position of objects or surfaces that result when they are viewed from two separate points, i.e., with two eyes. It is this change in relationship on the two retinas of the eyes of the user that the mind interprets, through the process called perception, as changes in spatial relationships. Thus, the mind is conditioned to accept the fact that retinal images are upside down and left to right, but reverses both of these so that the mind sees things as they really are and further, the change in relationships between things and surfaces as seen on each retina are interpreted spatially.

It is the left to right reversal that produces the second effect of fore to aft reversal and this fundamentally alters the observers perception of the form and shape of objects and of the relative position of objects to each other. This is both a physiological and psychological phenomena since it involves retinal images and the mind's interpretation of these images. Binocular perception is what results when we view something with two eyes and since each eye sees things from slightly different angles, each eye has a slightly different retinal image. These differing images are combined in the brain or mind and the end result is what is called binocular perception.

Device 10 operates in a manner such that it does not cause a change in the image on the retina in that the image is still upside down but it does reverse the image left to right. Thus, the image on a retina is upside down but it is "reality" in that its left to right orientation is that of the scene itself. The mind, however, continues to alter both the vertical and left to right orientation and, since the image reaching the retina through device 10 is "correct", it reverses it also. Thus, it is seen to be reversed left to right. If only a single eye is used for viewing through device 10, the left to right reversal is simply just that; there is no fore-to-aft reversal. When two eyes are used, this reversal also alters the relative relationship of things and objects to each other in the two retinal images and if the mind continues to function "normally", this changed relationship will be interpreted as a reversed relationship in a spatial sense. Thus, close objects are seen to be further away than distant ones. A concave bowl will be seen to be convex. A ball, for instance, on the floor will appear to be sunk into the floor. A marble or small ball rolling around the inside of a bowl will eventually appear to roll up and over the top of a convex surface, finally coming to rest on the very top. It can be concluded, therefore, that the fore-to-aft reversal is a direct result of the left to right reversal.

Without using prisms, the only way to achieve fore-to-aft reversal is with an arrangement of mirrors in which the "viewpoint" normally received by the left eye is "fed" to the right eye and that viewpoint normally received by the right eye is fed to the left eye. This mirror system is difficult to build and extremely difficult to align. In use, it requires constant adjustment for convergence and divergence. Also, this mirror arrangement does not produce a left-to-right reversal.

Another important feature of device 10 is the way in which the optical axis of each pair of mated prisms is angled with respect to the other pair of prisms. The mounting structure for the prism pairs is constructed and positioned so that there is a slight convergence of the pairs of prisms as the optical axes thereof extend forwardly from device 10. This can be illustrated in FIG. 2 by indicating that the distance between points 64 and 66 adjacent to the rear of the prism pairs (the length of line 51 of FIG. 2a) is greater than the distance between points 68 and 70 at the opposite or forward points of the prism pairs (the length of line 53 of FIG. 2a). For purposes of illustration, the distance between points 64 and 68 of prism pair 32 and the distance between points 66 and 70 of prism pair 34 is approximately 1½ inches. This is the length of each long side 46. This particular distance, the distance between points 64 and 66 will be of the order of 65 millimeters and the distance between points 68 and 70 will be approximately 64 millimeters. This will cause the value of angle $2\alpha$ to be approximately 1½°. Because of this convergence, the user of device 10 will be able to view both distant objects and close objects with ease. If the axes were to be parallel, distant objects could be viewed but objects closer than about 20 feet would be viewed with difficulty because of the formation of double images by the prism pairs. If the angle of convergence is too great, close objects can be viewed easily but double images will be seen with respect to distant objects.

The angle of convergence $2\alpha$ is quite small but critical. It is a constant factor and is independent of the size of the prisms. The angle is in the range of ¼° to 2° and on the average, is approximately one and a half degrees. Moreover, the distance between points 64 and 66 (FIG. 2) could vary several millimeters on either side of the above-mentioned 65 millimeters; similarly, the distance between points 68 and 70 could vary several millimeters on either side of the distance 64 millimeters described above.

Device 10 produces no magnification or demagnification. Also, no chromatic aberration or any other optical aberration results with the use of device 10. It is possible, however, to introduce other visual aberrations by use of simple attachments.

Reflective material inserted between each pair of prisms can be selected from materials that tend to pass primarily red light and this might have valuable applications under certain circumstances. With respect to the spacers for holding the prisms separated, this could possibly be achieved not only with the spacers but with a thin sheet of non-reflective material coated on both sides with finely grained "pointed" surfaces that would provide separation of the prisms with only "point" contacts with the prisms. Thus, ghosting of images would be so minimal as to not bother the person using device 10. Also, reflective material between the prisms can include material that has regular or random patterns of various colors. This material could produce what might be called a psychedelic effect.

Device 10 could also be provided with means for attaching the same to the head so that it could be used without being hand-held. This would permit the use of the device in games such as three-dimensional mazes or other games involving construction or movement of component items.

Supplement attachments capable of being used with device 10 includes a field glass conversion kit that could provide for a binocular effect, such as up to about 2½ power. In addition, a close-up attachment could be provided that will give additional convergence and permit viewing with ease from about 3 feet down to about 10 inches. Components can be used that will introduce horizontal and/or vertical aberrations. Polarizing devices, colored filters and attachments that will cause dynamic color or chromatic value changes can be used with device 10. A wide-base stereo attachment that can be used with or without the viewer can be used as well.

I claim:

1. A binocular viewing device comprising: a housing having a pair of light entrance ports and a pair of light exit ports, each light exit port being aligned with a respective light entrance port to present a corresponding light path through the housing; a pair of prism assemblies, there being a prism assembly for each light path, respectively, each prism assembly including a pair of triangular prisms with each prism having an internal reflecting surface; and means coupled with the housing for rigidly mounting each prism assembly therewithin across the respective light pAth with the prisms thereof being mounted in the Dove mode and with the reflecting surfaces of the prisms being in proximity to each other and extending longitudinally of the respective light path, the plane of each internal reflecting surface of each of the prism assemblies being convergent toward a corresponding plane of the other prism assembly as the corresponding light entrance port is approached.

2. A device as set forth in claim 1, wherein each of the prisms is a right angle prism having a hypotenuse, the prisms of each assembly being positioned with the hypotenuse of one prism in proximity to the hypotenuse of the other prism, and including means between said prisms of each prism assembly, respectively, for spacing the same apart.

3. A device as set forth in claim 2, wherein said spacing means includes a layer of reflective material.

4. A device as set forth in claim 2, wherein said spacing means includes a pair of spacers disposed at spaced locations between the prisms of each assembly, respectively, to present an air space therebetween.

5. A device as set forth in claim 2, wherein said prism has an apex, said mounting means including a mounting member having a recess for complementally receiving the apex of a respective prism.

6. A device as set forth in claim 1, wherein said mounting means includes a number of ribs for each assembly, respectively, the ribs corresponding to each assembly being secured to the housing and forming a recess for complementally receiving the assembly to thereby prevent any relative movement between the prisms thereof.

7. A device as set forth in claim 1, wherein said housing has a top cover and a bottom wall, the prisms of said prism assemblies spanning the distance between said top cover and said bottom wall, each of said cover and said wall having rib means on the inner surface thereof for engaging the adjacent outer surfaces of respective prisms of each assembly, respectively, to hold the assemblies in operative positions and to prevent any relative movement between the prisms of each assembly.

8. A device as set forth in claim 1, wherein is provided means on the housing adjacent to at least one of said ports for attaching an accessory to the housing across the port.

9. A binocular viewing device comprising: a pair of prism assemblies, each assembly including a pair of triangular prisms with each prism having an internal reflecting surface; a support; and means rigidly mounting the assemblies on the support at spaced locations to permit the assemblies to be viewed by respective eyes with each assembly being positioned with internal reflecting surfaces of its prisms spaced from and in proximity to each other and extending longitudinally of the direction in which an object is to be viewed, said internal reflecting surfaces of each assembly being relatively convergent to the internal reflecting surfaces of the other assembly as the assemblies approach an object to be viewed.

10. A device as set forth in claim 9, wherein said support includes a housing, said mounting means comprising structure in the housing for mechanically holding the prisms of each assembly in proximity to each other, and including a layer of reflective material between the prisms of each assembly, respectively.

11. A device as set forth in claim 9, wherein the angle of convergence between the internal reflecting surfaces of each assembly is in the range of 0.4 degrees to 2.0 degrees.

12. A device as set forth in claim 11, wherein each prism comprises a right angle prism having a hypotenuse, the internal reflecting surface of each prism extending along its hypotenuse, the length of the hypotenuse being in the range of 1.375 inches to 1.625 inches.

13. A device as set forth in claim 11, wherein each prism comprises a right angle prism, whereby each assembly has a pair of opposed, generally rectangular ends, said support comprising a housing having a top and a bottom, the ends of each assembly being adjacent to the top and the bottom, respectively, said mounting means including a number of ribs on each of the top and bottom, the ribs corresponding to each assembly being disposed to present a pair of aligned recesses to complementally receive the opposed ends of the corresponding assembly and to hold the prisms thereof in proximity to each other to thereby prevent any substantial relative movement therebetween.

14. A device as set forth in claim 11, and including means between the prisms of each assembly for spacing the same from each other, said spacing means including a sheet of non-reflective material coated on both sides with said material having a finely grained, pointed surface texture providing spatial separation of the prisms of the corresponding assembly with the texture providing substantially only point contacts with adjacent prisms.

* * * * *